United States Patent
Kristoffersen et al.

(10) Patent No.: US 7,338,450 B2
(45) Date of Patent: Mar. 4, 2008

(54) METHOD AND APPARATUS FOR PERFORMING CW DOPPLER ULTRASOUND UTILIZING A 2D MATRIX ARRAY

(75) Inventors: Kjell Kristoffersen, Oslo (NO); Glenn Reidar Lie, Menomonee Falls, WI (US)

(73) Assignee: General Electric Company, Schenectady, NY (US)

( * ) Notice: Subject to any disclaimer, the term of this patent is extended or adjusted under 35 U.S.C. 154(b) by 535 days.

(21) Appl. No.: 10/928,077

(22) Filed: Aug. 27, 2004

(65) Prior Publication Data
US 2006/0058656 A1    Mar. 16, 2006

(51) Int. Cl.
*A61B 8/00* (2006.01)
*A61B 8/02* (2006.01)
*A61B 8/12* (2006.01)
*A61B 8/14* (2006.01)
*A61B 8/16* (2006.01)

(52) U.S. Cl. ............... 600/447; 600/437; 600/443; 600/453; 600/454; 600/455; 600/457; 600/459

(58) Field of Classification Search ........... 600/447, 600/437; 73/861.25
See application file for complete search history.

(56) References Cited

U.S. PATENT DOCUMENTS

| | | | | |
|---|---|---|---|---|
| 4,143,650 A | * | 3/1979 | Hatke | 600/453 |
| 4,333,353 A | * | 6/1982 | Baumoel | 73/861.25 |
| 4,598,589 A | | 7/1986 | Riley et al. | |
| 4,608,993 A | * | 9/1986 | Albert | 600/457 |
| 4,914,439 A | * | 4/1990 | Nakahashi et al. | 341/131 |
| 4,944,189 A | * | 7/1990 | Nakajima et al. | 73/861.25 |
| 5,311,180 A | * | 5/1994 | Borgen | 341/131 |
| 5,406,949 A | * | 4/1995 | Yao et al. | 600/457 |
| 5,447,509 A | * | 9/1995 | Mills et al. | 606/1 |
| 6,261,232 B1 | * | 7/2001 | Yokosawa et al. | 600/443 |
| 6,527,722 B1 | | 3/2003 | Fazioli et al. | |
| 6,965,634 B1 | * | 11/2005 | Clark | 375/150 |
| 2004/0122321 A1 | | 6/2004 | Alexandru | |

OTHER PUBLICATIONS

Cited References French Search Report; No. 0508443; Oct. 10, 2007; 1 pg.

* cited by examiner

*Primary Examiner*—Brian L. Casler
*Assistant Examiner*—James Kish
(74) *Attorney, Agent, or Firm*—Small Patent Law Group; Dean D. Small

(57) ABSTRACT

An ultrasound system is provided comprising an ultrasound probe having a 2D matrix of transducer elements transmitting a continuous wave (CW) Doppler transmit signal into an object of interest. The CW transmit signal includes a dither signal component and the probe receives ultrasound echo signals from the object in response to the CW transmit signal. The probe generates an analog CW receive signal based on the ultrasound echo signals. An analog to digital (A/D) converter converts the analog CW receive signal to a digital CW receive signal at a predetermined sampling frequency and a processor processes the digital CW receive signal in connection with CW Doppler imaging.

22 Claims, 4 Drawing Sheets

METHOD AND APPARATUS FOR PERFORMING CW DOPPLER ULTRASOUND UTILIZING A 2D MATRIX ARRAY

BACKGROUND OF THE INVENTION

The present invention generally relates to continuous wave (CW) Doppler ultrasound methods and apparatus utilizing a two-dimensional (2D) matrix array, and more particularly to CW Doppler methods and apparatus that utilize a dither signal component in the CW transmit signal.

Ultrasound systems have been proposed that afford a variety of techniques for examining an object of interest, whether it be human, animal, underground cavities, physical structures and the like. Examples of medical diagnostic imaging techniques include B-mode imaging, color flow imaging, power Doppler imaging, pulse-wave Doppler imaging, tissue velocity imaging, continuous wave Doppler imaging and the like. The various imaging techniques may include presenting to the user 2D or 3D images, temporal graphs (e.g., motion over time), and the like. During CW Doppler imaging, conventional systems drive an ultrasound probe to transmit a non-interrupted continuous wave ultrasound signal at a desired constant frequency. The waveform of the CW signal may be sinusoidal, a square wave and the like. In the frequency domain, the CW signal includes a single frequency component such that the associated frequency spectrum would exhibit a single spectral line proximate the carrier frequency (e.g., the transmitted CW signal would have substantially 0 bandwidth).

Conventional ultrasound systems have utilized a variety of probe constructions to carry out the associated examination technique. Examples of probes include transesophageal probes, convex probes, sector probes, bi-plane, tri-plane, and the like. The probe typically includes a group of transducer elements arranged in a one or two dimensional array. The transducer elements may be electronically controlled individually or in groups. Heretofore, ultrasound systems have utilized probes comprising a 1D array of elements to perform steerable CW Doppler imaging. The 1D array is divided into a first group of transducer elements proximate one section of the probe that continuously transmit the CW Doppler transmit signal and a second separate group of transducer elements that continuously receive echo signals.

In the probe, each transducer element is connected to one or more preamplifiers. Ultrasound systems that utilize 2D matrix probes have been proposed that perform sub-array (a.k.a. sub-aperture) beamforming in the probe to reduce the channel count connected to from the system from approximately 2000 to approximately 128 channels. The signals from a group (e.g., 4×4) of neighbor elements are delayed and summed in a sub-array processor, and the analog output from one subaperture processor is fed back to an associated channel of the receive (Rx) beamformer. The electronics to perform sub-array beamforming in the probe locates a large number of preamplifiers in the probe. Given the number of preamplifiers, it is desirable to use low-power preamplifiers in the probe.

Most ultrasound imaging modes (B-mode, Color Doppler, PW Doppler etc) transmit pulsed ultrasound. In pulsed ultrasound, the echo signals have different intensities when detected by the transducer elements depending upon the distance from the probe to the originating point of the echo signal. Echo signals originating deep within the object (far field) have lower intensity, while echo signals originating near the probe (near field) have higher intensity. In contrast, CW Doppler ultrasound is transmitted and received continuously, and thus signals from the near field and the far field are simultaneously present in the received signal thereby requiring a large dynamic range of the CW processing chain.

The receive preamplifiers in the probe have a limited dynamic range. The preamplifier dynamic range is closely correlated to the amplifier power requirements. As the number of transducer elements is increased, similarly the number of receive amplifiers is increased. As the number of amplifiers increases, power requirements also increase. In CW ultrasound mode, the gain of the preamplifiers is set so that their far-field sensitivity is maintained at a desired level. Due to dynamic range limitations, the receive preamplifiers may be driven into saturation by the near field echoes (sometimes referred to as carrier feed-through or cross-talk) a large fraction of the time. Driving the preamplifiers into saturation introduces errors in the CW signal processing chain.

A need remains for an ultrasound method and apparatus capable of reducing the effects of errors introduced into the processing chain. A need also remains for an ultrasound method and apparatus utilizing a low power probe having a 2D matrix array to perform CW ultrasound imaging.

BRIEF DESCRIPTION OF THE INVENTION

In one embodiment, an ultrasound system is provided comprising an ultrasound probe having a 2D matrix of transducer elements transmitting a continuous wave (CW) Doppler transmit signal into an object of interest. The CW transmit signal includes a dither signal component and the probe receives ultrasound echo signals from the object in response to the CW transmit signal. The sub-array processors within the probe generates a number of analog CW receive signals based on the ultrasound echo signals. These signals are delayed and summed in an analog beamformer and converted to a base-band I/Q signal by a complex demodulator. An analog to digital (A/D) converter converts the base-band signal to a digital I/Q signal at a predetermined sampling frequency and a processor processes the digital CW receive signal in connection with CW Doppler imaging.

In accordance with an alternative embodiment, a method is provided for performing an ultrasound examination of an object. The method comprises providing a continuous wave (CW) transmit signal having a carrier wave and a dither signal component and transmitting the CW transmit signal into an object of interest utilizing an ultrasound probe having a 2D matrix of transducer elements. The method further includes receiving ultrasound echo signals from the object in response to the CW transmit signal and generating an analog CW receive signal based on the ultrasound echo signals received. The analog CW receive signal is sampled at a predetermined sampling frequency to produce a digital CW receive signal and the digital CW receive signal is processed.

Optionally, the method may comprise generating the dither signal component as a modulated signal that is modulated onto the carrier wave of the CW transmit signal where the modulated signal relates to the sampling frequency. The carrier wave of the CW transmit signal may be modulated by at least one of phase and amplitude modulation to introduce the dither signal component into the CW transmit signal.

DETAILED DESCRIPTION OF THE INVENTION

Figure 1:
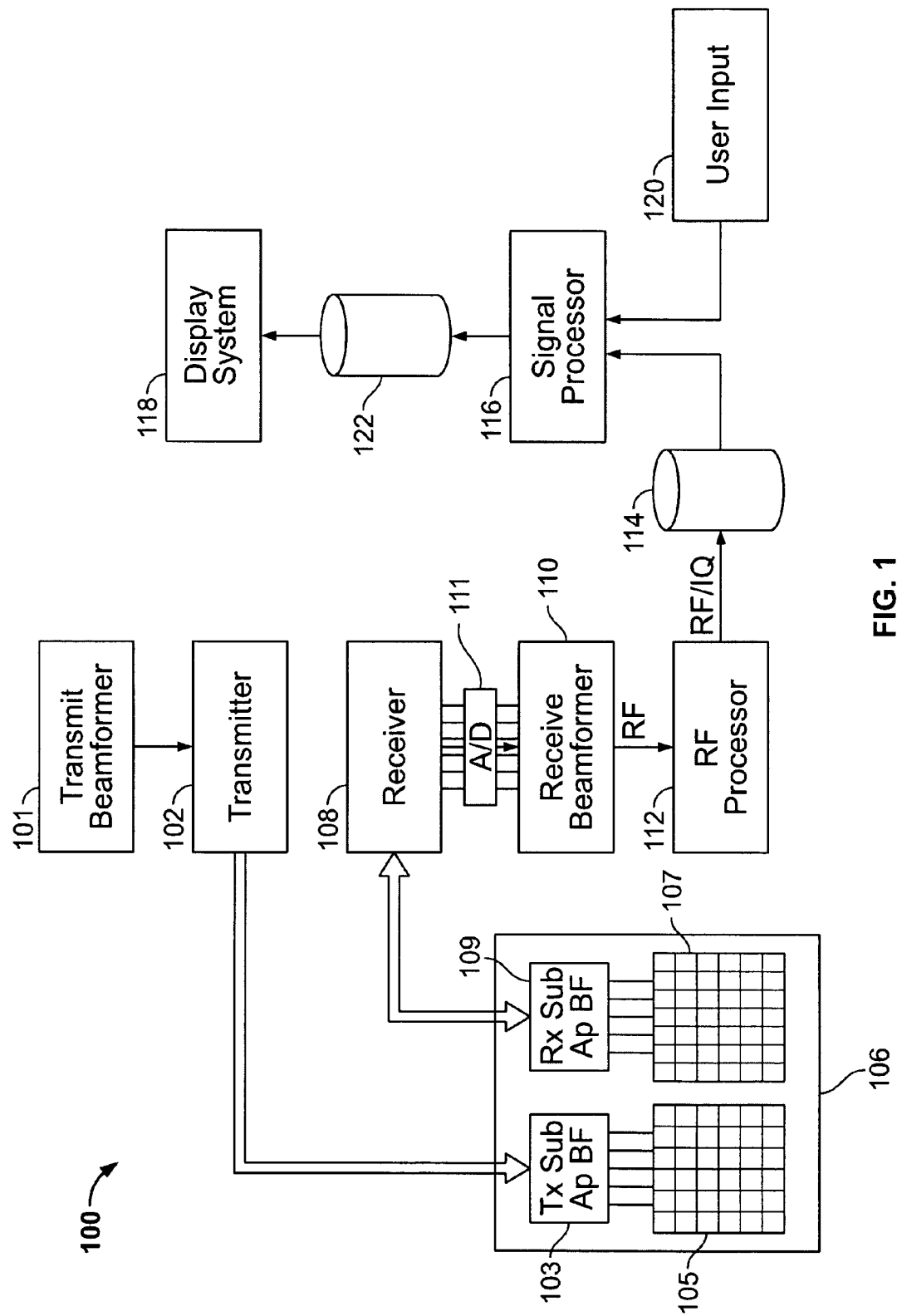
FIG. 1 illustrates a block diagram of an ultrasound system formed in accordance with an embodiment of the present invention.

FIG. 1 illustrates a block diagram of an ultrasound system 100 formed in accordance with an embodiment of the present invention. The ultrasound system 100 includes a transmitter 102 which drives a probe 106. The probe 106 may include a 1D array, a 1.25 D array, a 1.5 D array, a 1.75 D array, a 2 D array and the like. Optionally, the probe could stand-alone CW probe with a single transmit element and a single receive element. In FIG. 1, a two dimensional (2D) array of elements 104 is shown within the probe 106. The probe 106 includes a transmit group of elements 105 and a receive group of elements 107. A transmit beamformer 101 controls a transmitter 102 which, through transmit sub-aperture beamformers 103, drives a group of elements 105 to emit continuous wave (CW) ultrasonic transmit signals into a region of interest (e.g., human, animal, underground cavity, physical structure and the like). The transmitted CW ultrasonic signals are back-scattered from structures in the object of interest, like blood cells, to produce echoes which return to the group of elements 107.

The receive group of elements 107 convert the received echoes into analog signals, undergo sub-aperture beamforming by receive sub-aperture beamformers 109 and are then passed to a receiver 108. The output of the receiver 108 is communicated to a receive beamformer 110, which performs additional beamforming operations and outputs an RF signal. A/D converters 111 are illustrated between the receiver 108 and receive beamformer 110 to illustrate that the incoming received signals may be converted from analog to digital form at the front end of the beamformer 110 (such as in analog beamformer).

The receiver 108 and beamformer 110 maybe combined into a single beamformer which may be digital. The RF signal is then are provided to an RF processor 112. The RF processor 112 may include a complex demodulator (not shown) that demodulates the RF signal to form IQ data pairs representative of the echo signals. The RF or IQ signal data may then be routed directly to an RF/IQ buffer 114 for temporary storage. A user input 120 may be used to input patient data, scan parameters, a change of scan mode, and the like.

The ultrasound system 100 also includes a signal processor 116 to process the acquired CW Doppler information (i.e., RF signal data or IQ data pairs) for presentation on display system 118. The signal processor 116 is adapted to perform one or more processing operations according to a plurality of selectable ultrasound modalities on the acquired ultrasound information. Acquired ultrasound information may be processed in real-time during a scanning session as the echo signals are received. Additionally or alternatively, the ultrasound information may be stored temporarily in RF/IQ buffer 114 during a scanning session and processed in less than real-time in a live or off-line operation.

The ultrasound system 100 may continuously acquire ultrasound information, such as CW ultrasound signals. An image buffer 122 is included for storing processed frames of acquired ultrasound information before display. The image buffer 122 may comprise any known data storage medium.

Figure 2:
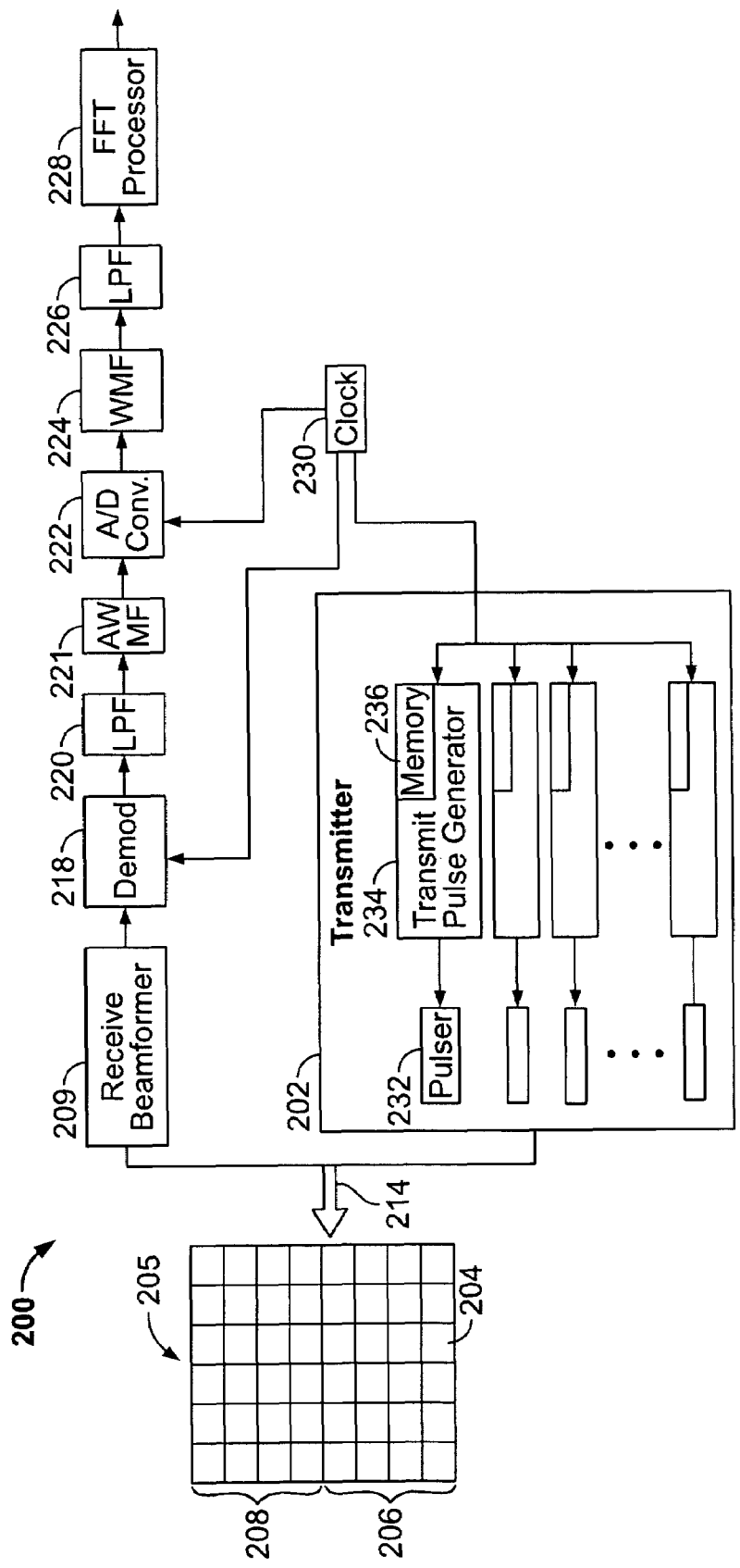
FIG. 2 illustrates a block diagram of a front end subsystem of an ultrasound system formed in accordance with an embodiment of the present invention.

FIG. 2 illustrates a block diagram of a front end subsystem 200 of an ultrasound system. The front end subsystem 200 is connected to a probe 205 containing a 2D array of transducer elements 204. The elements 204 are divided into a transmit group 206 and a receive group 208. The transmit group 206 continuously transmits a CW transmit signal generated by the transmitter 202. Each element 204 within the receive group 208 continuously receives ultrasound echoes and delivers analog echo signals to receive beamformer 209. The transmitter 202 and receive beamformer 209 may be 1) physically separate or 2) implemented on common electronics boards using DSPs or 3) implemented on a common personal computer and the like.

The transmitter 202 and receiver beamformer 209 are interconnected with corresponding elements 204 in transmit and receive groups 206 and 208 through a coaxial link 214 having individual coaxial lines (e.g., 256 lines). A separate line within the link 214 may be associated with each element 104. Alternatively, the elements 204 may be organized into sub-aperture sets, each set of which has a single communications line in the link 214 joined to the transmitter 202 and/or receive beamformer 209.

The receiver beamformer 209 combines the receive echo signals from the elements 204 within the receive group 208 to form a CW receive signal. The receive echo signals and the CW receive signals are analog. The CW receive signal corresponds to echo signals generated at a designated region of interest within the object. For example, when performing CW Doppler imaging at a point within a blood vessel, the region of interest is within the blood vessel to permit the user to analyze blood flow at the region of interest. The receive beamformer 209 focuses the receive echo signals at the region of interest to associate the CW receive signal with the desired point in the blood vessel.

The CW receive signal is passed to a demodulator 218 which demodulates the CW receive signal. The demodulated signals from the demodulator 218 are passed to a low pass filter 220 for filtering, then to an analog wall motion filter 221, (AWMF), and then to an analog to digital (A/D) converter 222. The AWMF 221 filters out the strongest low frequency signal components, such as coming from static or slow moving tissue in the near field, thereby reducing the dynamic range requirements of the A/D converter 222. The A/D converter 222 samples the CW receive signal at a predetermined sampling frequency to produce a digital CW receive signal.

The sampling frequency of the A/D converter 222 is controlled in connection with the CW transmit signal from transmitter 202 to reduce the noise associated with the transmit dither to a periodic signal with period equal to the sampling frequency of the A/D converted multiplied by an integer. The timing of the demodulator 218 and A/D converter 222 is controlled by a common timing generator 230. The digital CW receive signal is then passed to a wall motion filter 224 which removes components from the CW receive signal associated with motion of tissue within the region of interest. The wall motion filter 224 also filters noise that is at or near DC level or an integral multiple of the sampling frequency. The output of the wall motion filter 224 is passed to a low pass filter 226 and then to a fast fourier transform (FFT) processor 228. The FFT processor 228 analyzes the CW receive signal and generates CW Doppler information that is presented to the user visually, audibly and the like through the display system 118.

The transmitter 202 includes a plurality of pulsers 232, each of which is associated with one transmit line conveyed over link 214 to one or a group of elements 204 within the transmit group 206. Each line is within link 214 and each pulser 232 is associated with a unique channel. Each pulser 232 is controlled by an individual associated transmit pulse generator 234. Each transmit pulse generator 234 contains a memory 236 which stores a digital representation of a transmit signal as a CW wave form segment. The CW wave form segment is repeatedly and continuously read from memory 236. The CW wave form segment defines a transmit signal including a carrier wave defining a fundamental frequency of the CW transmit signal and a dither signal component spin imposed thereon.

Optionally, the transmit pulse generator 234 may modulate a carrier wave with a dither signal component, such as based on a dither control signal provided from a dither signal source (not shown). Alternatively, the transmit pulse generator 234 may provide the carrier wave as the transmit signal to a modulator (not shown) that modulates the transmit signal based on the dither control signal from a dither source. The transmit signal represents the signal to be ultimately conveyed from the associated pulser 232.

The carrier wave may comprise any of a variety of wave forms, such as a square wave, a saw-tooth wave, a sinusoidal wave, a tri-level wave, a multi-level wave, and the like. The transmit signal includes a dither signal component superimposed on the carrier wave. The dither signal component is periodic and has a period that has a predetermined relation to the sampling frequency of the A/D converters 222. For example, the dither signal component may have a period that is an integer multiple of the sampling frequency of the A/D converters 222.

By way of example, the dither signal component may be superimposed upon the carrier wave by adjusting the phase of the carrier wave to produce a phase modulated or pulse width modulated square wave. Alternatively, the dither signal component may be superimposed upon the carrier wave by adjusting the amplitude of the carrier wave, thereby providing an amplitude modulated CW transmit signal.

Each transmit pulse generator 234 produces a CW transmit control signal passed to the corresponding pulser 232 which generates a CW transmit signal that is conveyed to a corresponding element 204 and the transmit group 206 of the probe. When the elements 204 are organized into subaperture sets, a common transmit pulser 232 may be used in connection with all of the elements 204 in an associated subaperture set. Alternatively, when each element 204 is controlled separately a separate transmit pulser 232 is provided for each element 204.

The transmit pulse generator 234 reads the CW transmit segment from memory 236 periodically based upon a synchronization signal received from the clock 230. Hence, the clock 230 provides three timing signals for the transmit pulse generator 234, demodulator 218 and A/D converters 222 for each transmit and receive channel. The three timing signals are synchronized with one another and having different frequencies.

Figure 3:
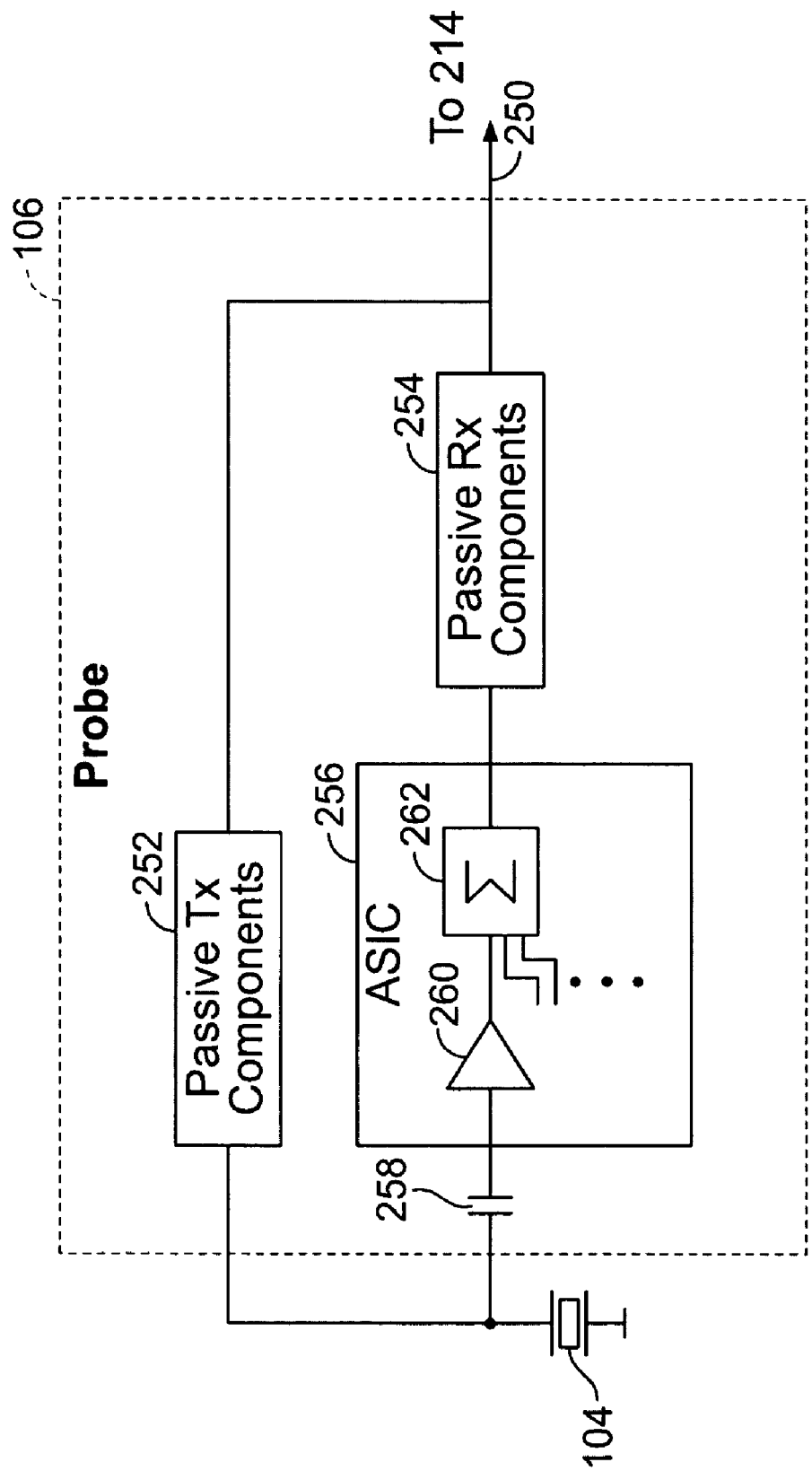
FIG. 3 illustrates a block diagram of transmit and receive electronics provided within a probe in accordance with an embodiment of the present invention.

It is understood that the block diagram of FIG. 3 illustrates a signal subaperture processor configuration, while a plurality of such subaperture processors are provided within the probe 106. Optionally, a programmable delay unit may be provided between each preamplifier and a corresponding summing node. Each subaperture processing module may drive a single receive channel.

Optionally, the transmitter may include a carrier wave source that generates a carrier wave defining the fundamental frequency of the CW transmit signal. The carrier wave may be passed to a modulator which modulates the carrier wave based on a dither control signal generated at a dither source. The dither control signal generated by the dither source is periodic and has a period that has a predefined relation to the sampling frequency of the A/D converters. For example, dither control signal may have a period that is an integer multiple of the sampling frequency of the A/D converters. The modulator superimposes a dither signal component onto the carrier wave based on the dither control signal. By way of example, the modulator may adjust the phase of the carrier wave based on the dither control signal. Alternatively, the modulator may adjust the amplitude of the carrier wave based on the dither control signal.

The modulator generates a pulser control signal that is passed to a series of transmit pulsers. The transmit pulsers each generate a CW transmit signal that is conveyed to a corresponding element in the transmit group of the probe.

In an alternative embodiment a digital beamformer may be used instead of an analog beamformer. The digital beamformer includes an A/D converter associated with each receive channel of the receive beamformer. The low pass filters 220 and 226, the AWMF 221 of the receive chain in FIG. 2 would be removed. Instead a sampling rate converter (SRC) would be added. The sampling rate would be equal to the sampling rate of the A/D converters of the digital beamformer divided by an integer. The transmit beamformer would be driven by the same clock as the A/D converters of the digital beamformer.

FIG. 3 illustrates a block diagram of a portion of the electronics provided within a probe 106 formed in accordance with an embodiment of the present invention. In FIG. 3, the probe 106 includes subaperture processing modules, each of which is associated with a subaperture set of transducer elements 104. For simplicity, a single transducer element 104 is illustrated along with a single associated subaperture processing module. An individual line or channel 250 within the communications link 214 is associated with element 104. When element 104 is desired to transmit, the CW transmit signal from a corresponding pulser 232 (FIG. 2) is conveyed along line or channel 250 through the passive transmit components 252. The output of the passive transmit components 252 drive the element 104. During transmit, the passive receive components 254 function as an open circuit to block passage of the transmit signal to ASIC 256. Capacitor 258 also isolates the ASIC 256 from the transmit signal.

During receive, echo signals detected by the transducer element 104 are converted to electrical signals and conveyed through capacitor 258 to the subaperture processor ASIC 256. The ASIC 256 includes, among other things, an amplifier 260 which amplifies the incoming electrical signal that is then passed to a summer 262 to be joined with other electrical signals from other amplifies and transducer elements joined in a sub-aperture set associated with transducer element 104. Optionally, signals from each transducer element 104 may be conveyed directly to an associated line 250 and to the front end subsystem 200 without being summed with signals from other transducer elements 104. In this alternative through passive receive components 254 onto the line 250 to be conveyed over the coaxial link 214 to the receiver 108.

The amplifier 260 may be selected to have a limited dynamic range providing a desired level of amplification for echo signals originating in the far field (e.g., several centimeters from the probe surface). When the amplifier 260 receives echo signals originating in the near field (e.g. within 1 or 2 centimeters from the probe), the amplifier 260 may reach the upper limit of its amplification range and saturate, thereby producing a clipped output signal. The amplifiers 260 introduce a non-linearity into the signal response of the probe 106 when the output of the amplifier 260 is clipped for echo signals originating in the near field. The probe 106, probe electronics, or system electronics may exhibit other non-linearities such as hysteresis and the like. Clipping, hysteresis and other non-linearities generate signal dependent noise which, if uncorrected, impacts the sensitivity of the probe 106. The signal dependent noise generated within the probe 106, at least due to clipping by the amplifier 260, is removed by the front end subsystem 200 during processing of the CW receive signals, namely at the A/D converter 222 and wall motion filter 224.

The dither signal is added to linearize the receiver chain, thereby improving overall signal-to-noise ratio in the spectral display. The major power fraction of the received signal originates from near field targets that are static or slowly moving. In a conventional CW system near field receive signal resembles a sine wave with a slowly changing amplitude and phase. When the near field receive signal is subjected to nonlinearities (e.g., clipping, hysteresis and the like) the error signal (defined as the difference between the output of an ideal processing channel and the actual processing channel) will also be a periodic signal with slowly varying amplitude and phase. The spectrum of the error signal may enter the pass-band of the CW Doppler system, thereby affording an increased noise level. The character of this noise is very objectionable, because it varies with the signal itself as the error signal moves in and out of the passband, as opposed to be a constant background noise.

When dither is added, the error signal becomes rapidly varying and spread out over a wide frequency band and only a small fraction of the power attributed to noise will come into the pass-band of the CW Doppler system. The amount of noise reduction improves with the amount of dither used and with the length of the period of the dither signal. However, the dither also reduces the correlation of the Doppler signal from blood, which gives a reduction in the signal power of the desired signal. The optimal signal-to-noise ratio is typically obtained using a small amount of dither, corresponding to a signal loss on the order of 1 dB.

Figure 4:
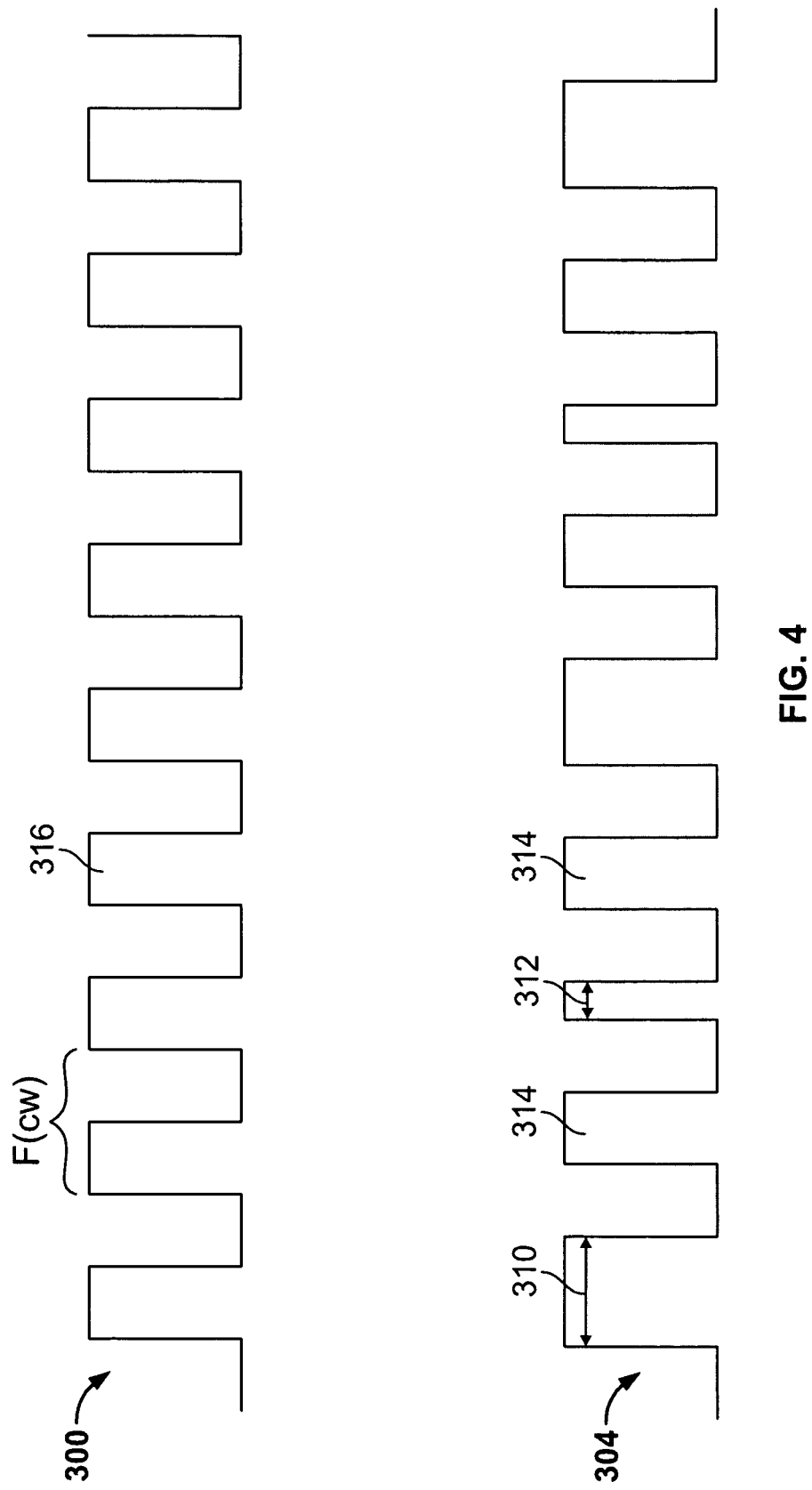
FIG. 4 illustrates an exemplary carrier wave, dither control signal and CW transmit signal formed in accordance with an embodiment of the present invention.

FIG. 4 illustrates an exemplary carrier wave 300, and CW transmit signal 304 having a dither signal component therein utilized in accordance with an embodiment of the present invention. The carrier wave 300 is a square wave having a frequency F(cw). The memory 236 stores the CW transmit signal 304.

The CW transmit signal 304 adjusts the phase of the carrier wave 300 forward and backward based by positive and negative phase shifts to introduce dither into the CW transmit signal 304. Positive phase shifts increase the pulse width in the CW transmit signal 304 (as denoted at 310), while negative phase shifts decrease the pulse width in the CW transmit signal 304 (as denoted at 312). Pulses 314 in the CW transmit signal 304 are equal in length to the pulses 316 in the carrier wave 300. The dither signal component has a period P(dcs) that is based on the sampling frequency of the A/D converters 222 (FIG. 2). Optionally, the transmitter may steer the CW transmit signal in two dimensions (e.g., azimuth and elevation) relative to elements of the probe.

Optionally, the transmitter may control the probe to perform multi-line transmit such that the probe simultaneously transmits a first CW transmit signal and a second CW transmit signal focused to different regions in the object. Simultaneously transmitting multiple CW transmit signals enables the system to acquire CW Doppler information related to multiple regions of interest at the same time. Optionally, the receiver may control the probe to perform multi-line receive. During multi-line receive, the probe focuses receive simultaneously in multiple regions of the object in order to simultaneously obtain more than one CW Doppler received signal.

Optionally, the dither signal component may have a period that is associated with other components besides A/D converter 222. For example, in a digital beamformer, the dither signal component may have a period that is an integer multiple of the A/D converters associated with each receive channel in the beamformer. Alternatively, the dither signal components may have a period that is an integer multiple of a spectrum analyzer within the system.

Optionally, a transmitter may control the probe to transmit the CW transmit signal into the object of interest where the transmitter modulates a carrier wave of the CW transmit signal by at least one of phase and amplitude modulation to introduce the dither signal component into the CW transmit signal. The dither signal component may constitute a periodic signal having a period that is an integer multiple of the sampling frequency of the A/D converter.)

While the invention has been described in terms of various specific embodiments, those skilled in the art will recognize that the invention can be practiced with modification within the spirit and scope of the claims.

What is claimed is:

1. An ultrasound system, comprising:
   a low power ultrasound probe transmitting a continuous wave (CW) transmit signal into an object of interest;
   a transmitter controlling said probe to transmit said CW transmit signal, said CW transmit signal including a dither signal component, said dither signal component being periodic, said probe receiving ultrasound echo signals from the object in response to said CW transmit signal, said probe outputting CW receive signals over at least one receive channel based on said ultrasound echo signals;
   a beamformer performing beamforming upon said CW receive signals from said at least one receive channel; and
   a processor processing an output from said beamformer.

2. The ultrasound system of claim 1, wherein said probe comprises one of a 1D array and a 2D matrix array of transducer elements.

3. The ultrasound system of claim 1, wherein said probe comprises a plurality transducer elements, said transducer elements being arranged into sub-aperture sets, each sub-aperture set being associated with an individual receive channel.

4. The ultrasound system of claim 1, wherein said beamformer is a digital beamformer having a plurality of analog to digital (A/D) converters associated with an equal plurality of receive channels.

5. The ultrasound system of claim 1, said further comprising a spectrum analyzer, wherein a period of said dither signal component equals a sampling period of a signal input to said spectrum analyzer divided by an integer.

6. The ultrasound system of claim 1, said further comprising a digital wall filter, wherein a period of said dither signal component equals a sampling period of said digital wall filter divided by an integer.

7. The ultrasound system of claim 1, wherein said CW transmit signal includes at least one of phase and amplitude modulation to introduce said dither signal component into said CW transmit signal.

8. The ultrasound system of claim 1, wherein said CW transmit signal comprises a carrier wave being one of a square wave, a sinusoidal wave, a tri-level wave, a multi-level wave and a saw-tooth wave.

9. The ultrasound system of claim 1, further comprising an A/D converter provided between said beamformer and said processor.

10. The ultrasound system of claim 1, wherein said probe electronically steers said CW transmit signal in two directions.

11. The ultrasound system of claim 1, wherein said beamformer controls said probe to perform multi-line transmit such that said probe simultaneously transmits first and second CW transmit signals focused to different regions in the object to simultaneously acquire CW Doppler information related to first and second regions, respectively.

12. The ultrasound system of claim 1, wherein said beamformer performs multi-line receive to focus simultaneously said probe at first and second different regions in the object.

13. A method for performing an ultrasound examination of an object, comprising:
providing a continuous wave (CW) transmit signal having a carrier wave and a periodic dither signal component, wherein said CW transmit signal is at least one of phase and amplitude modulated to introduce said periodic dither signal component into said CW transmit signal;
transmitting said CW transmit signal into an object of interest utilizing an ultrasound probe;
receiving ultrasound echo signals from the object in response to said CW transmit signal;
generating CW receive signals based on said ultrasound echo signals received; and
processing said CW receive signal.

14. The method of claim 13, wherein said dither signal component constitutes a periodic signal having a period that is an integer multiple of a sampling frequency of said CW receive signal.

15. The method of claim 13, wherein said carrier wave is one of a square wave, a sinusoidal wave, and a saw-tooth wave.

16. The method of claim 13, further comprising electronically steering said CW transmit signal in two directions.

17. The method of claim 13, further comprising controlling said probe to perform multi-line transmit such that said probe simultaneously transmits first and second CW transmit signals focused to different regions in the object to simultaneously acquire CW Doppler information related to first and second regions, respectively.

18. The method of claim 13, further comprising performing multi-line receive to focus simultaneously said probe at first and second different regions in the object.

19. An ultrasound system, comprising:
an ultrasound probe having a 2D matrix array of transducer elements for transmitting a continuous wave (CW) transmit signal into an object of interest, wherein said CW transmit signal includes a dither signal component and said CW transmit signal is at least one of phase and amplitude modulated to introduce said dither signal component into said CW transmit signal;
a transmitter controlling said probe to transmit said CW transmit signal, said probe receiving ultrasound echo signals from the object in response to said CW transmit signal, said probe outputting CW receive signals over at least one receive channel based on said ultrasound echo signals;
a beamformer performing beamforming upon said CW receive signals from said at least one receive channel; and
a processor processing an output from said beamformer.

20. The ultrasound system of claim 19, wherein said elements of said probe are arranged into a transmit group and a receive group, said transmit group transmitting said CW transmit signal, said receive group receiving said ultrasound echo signals.

21. The ultrasound system of claim 19, wherein said probe comprises multiple sub-aperture processing modules, each of which being associated with one of a unique receive and transmit channel.

22. The ultrasound system of claim 19, wherein said probe steers said CW transmit signal in two directions.

* * * * *